United States Patent

Straker

Patent Number: 5,294,852
Date of Patent: Mar. 15, 1994

[54] THERMALLY PROTECTED ELECTRIC MOTOR

[75] Inventor: Gary Straker, Hong Kong, Hong Kong

[73] Assignee: Johnson Electric S.A., Switzerland

[21] Appl. No.: 874,005

[22] Filed: Apr. 27, 1992

[30] Foreign Application Priority Data

Apr. 29, 1991 [GB] United Kingdom ............... 9109194

[51] Int. Cl.$^5$ .................... H02K 11/00; H02K 5/14
[52] U.S. Cl. ................................ 310/68 C; 310/239; 310/72
[58] Field of Search ............... 310/68 C, 71, 72, 220, 310/239; 361/27; 439/485

[56] References Cited

U.S. PATENT DOCUMENTS

| | | | |
|---|---|---|---|
| 4,037,316 | 7/1977 | Stoll | 310/68 C |
| 4,315,237 | 2/1982 | Middleman et al. | 338/22 R |
| 4,499,517 | 2/1985 | Lisauskas | 310/68 C |
| 4,689,595 | 8/1987 | Jergensen | 337/107 |
| 4,698,614 | 10/1987 | Welch et al. | 338/22 R |
| 4,795,079 | 1/1989 | Yamada | 439/485 |
| 4,801,833 | 1/1989 | Dye | 310/68 C |
| 5,010,264 | 4/1991 | Yamada et al. | 310/68 C |
| 5,089,801 | 2/1992 | Chan et al. | 338/22 R |

FOREIGN PATENT DOCUMENTS 1594334 7/1981 United Kingdom .

Primary Examiner—Steven L. Stephan
Assistant Examiner—C. LaBalle
Attorney, Agent, or Firm—Ostrolenk, Faber, Gerb & Soffen

[57] ABSTRACT

A laminated, metal-polymer-metal PTC resistor (8) is held in the end cap (2) of an electric motor. Substantially parallel opposed surfaces (9 and 10) of the PTC resistor (8) are engaged by electrically conductive members (11 and 12) which are respectively connected to one of the brushes (5) and one of the motor terminals (6) so that the supply of electricity is interrupted when the PTC resistor (8) is heated above a predetermined temperature as a result of excessive current flow. The PTC resistor (8) is supported against movement perpendicular to the substantially parallel opposed surfaces (9 and 10), at least in one direction, and therefore independently of at least one of the contact members (11 and 12) so that, at most, only one of the contact members (11 and 12) is needed for supporting the PTC resistor (8). Both contact members (11 and 12) can therefore make point contact with the PTC resistor (8) and this improves operation by inhibiting the conduction of heat to or from the PTC resistor (8).

9 Claims, 2 Drawing Sheets

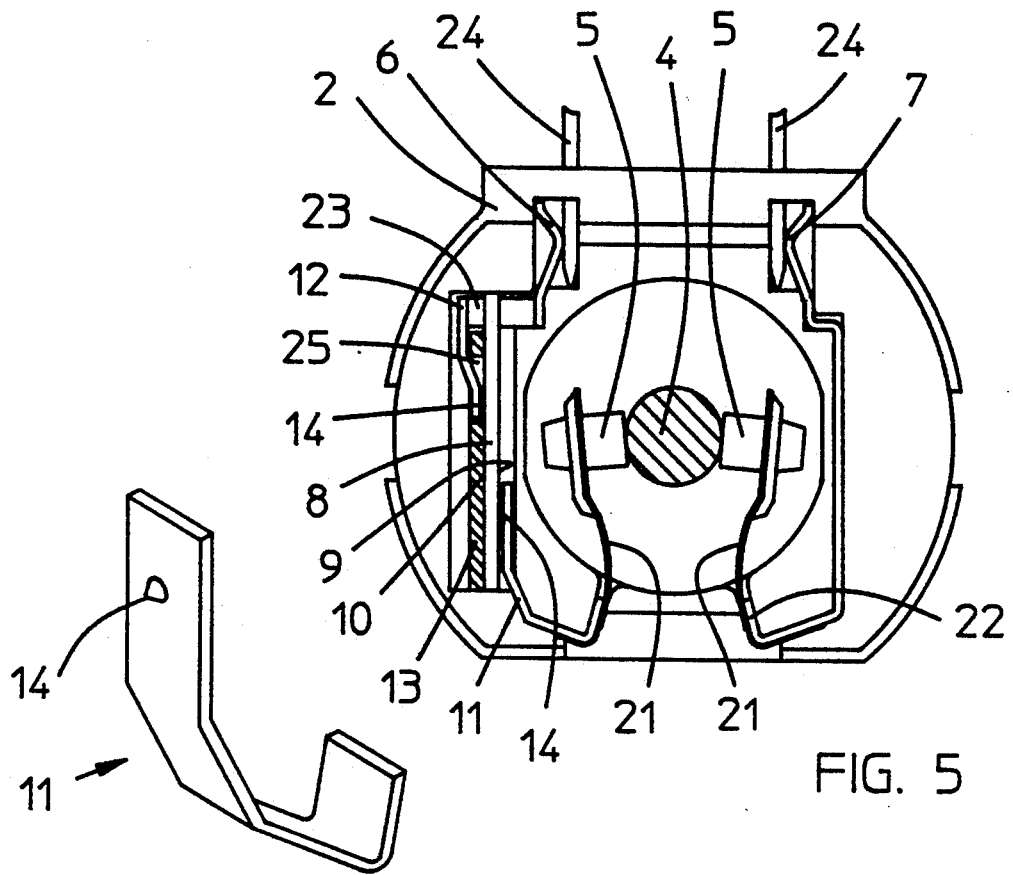

THERMALLY PROTECTED ELECTRIC MOTOR

FIELD OF THE INVENTION

The invention relates to an electric motor which is protected against overload by means of a laminate positive temperature coefficient resistor (a laminate "PTC" resistor) which greatly increases in resistance as a result of the increase in temperature above a predetermined value caused by the flow of overload current through the resistor.

BACKGROUND ART

U.S. Pat. No. 5,010,264 discloses a thermally protected electric motor such as this comprising a housing having an end cap at one end; a rotor, incorporating a commutator, mounted within the housing; brushes, engaging the commutator, and terminals, for connecting the brushes to an external electric supply, mounted within the end cap; a laminate PTC resistor mounted within the end cap and having two substantially parallel opposed surfaces; and two electrically conductive contact members connected, respectively, to one of the brushes and one of the terminals and respectively engaging the two surfaces.

Although this form of construction provides compact accommodation for the laminate PTC resistor, most PTC resistors have significant internal resistance which detracts from the viability of this form of protection. Moreover, with the prior art form of construction, it is difficult to overcome this deficiency by using a low resistance laminate PTC resistor in the form of a laminated, metal-polymer-metal PTC resistor such as that used in circuit protection devices sold by Raychem Corporation of Menlo Park, Calif., U.S.A., under the trademark "POLYSWITCH" and disclosed in U.S. Pat. Nos. 4,237,441, 4,238,812, 4,255,698 and 4,315,237.

This is because the operation of a laminated, metal-polymer-metal PTC resistor is critically impaired by excessive localized contact pressure, which deforms the layers and adversely affects the variable conductivity of the polymer layer, and by the conduction of heat between the PTC resistor and its surrounding. In the prior art construction, the two contact members are required to clamp the PTC resistor in place and so must be coextensive with substantial areas of the transverse surfaces of the PTC resistor. As these contact members are thermally conductive, they constitute either random heat sinks which absorb heat generated in the PTC resistor by current flow through the PTC resistor or random heat sources which transmit heat generated elsewhere to the PTC resistor. Clearly, where a laminated, metal-polymer-metal PTC resistor is used, this flow of heat into or out of the PTC resistor adversely affects the protective operation of the PTC resistor. However, if the contact areas are reduced, there is a danger that the contact pressure will become excessive.

DISCLOSURE OF THE INVENTION

The purpose of the present invention is to provide an improved thermally protected electric motor in which the flow of extraneous heat into and out of the PTC resistor can be inhibited in accordance with the characteristics of the PTC resistor. This is achieved by utilizing a laminate PTC resistor which is a laminated metal-polymer-metal PTC resistor and by providing the end cap with insulating supporting means which engage and thereby directly support the laminate PTC resistor against movement perpendicular to the opposed surfaces, at least in one direction.

With this form of construction, it is possible to provide the contact members with contact portions which make sufficiently small contact with the two opposed surfaces of the laminate PTC resistor to avoid serious adverse operation of the PTC resistor and to provide more predictable thermal protection for the motor. Indeed, even where the PTC resistor is clamped between insulating supporting means co-extensive with a substantial part of one of the PTC resistor's opposed surfaces and a contact member engaging the other surface, the support provided by the support means ensures that the area and the contact pressure of the contact member can both be significantly reduced.

REASON PARAGRAPH

Thus, according to the invention, there is provided a thermally protected electric motor in which an end cap is formed with thermally insulating supporting means which engage and thereby directly support a laminated, metal-polymer-metal PTC resistor against movement perpendicular to substantially parallel opposed surfaces of the PTC resistor, at least in one direction, and two electrically conductive contact members respectively engaging the substantially parallel opposed surfaces of the PTC resistor and respectively connected to one of the brushes of the motor and to one of two terminals for connecting the brushes to an external electric supply.

In this way, it is possible to provide embodiments in which at least one of the contact members is relieved of the function of supporting and/or holding the PTC resistor.

At least one of the contact members may be provided with a contact portion which makes point contact or line contact with one of the two opposed surfaces of the laminate PTC resistor and, in a preferred embodiment, both contact members are provided with contact portions which make point contact or line contact, respectively, with the two opposed surfaces of the laminate PTC resistor.

Another way to reduce the flow of heat to and from a contact portion is to form the contact member with a neck portion between the contact portion and the remainder of the contact member.

In a simple form of the invention, the thermally insulating supporting means grip the laminate PTC resistor, for example: at opposite edges, so as to support the laminate PTC resistor against movement perpendicular to the opposed surfaces of the PTC resistor, in both directions. In this case the two contact members play no part in holding the PTC resistor and, to reduce pressure on the laminated, metal-polymer-metal PTC resistor, which also adversely affects operation of the PTC resistor, the two contact portions are arranged to contact the opposed surfaces on opposite sides of the PTC resistor at points which are spaced from each other as measured along a plane parallel to the opposed surfaces.

Alternatively, where the thermally insulating supporting means comprise an abutment which engages one of the opposed surfaces, the PTC resistor may be clamped firmly between the abutment and one of the two contact members. In this case, the other contact member merely contacts the PTC resistor and plays no part in holding the PTC resistor.

In a more complex form of the invention, the thermally insulating supporting means comprise two abutments which cooperate, respectively, with the two electrically conductive contact members and the laminate PTC resistor has two parts which are clamped against the two abutments, respectively, by the two contact members.

A thermally protected electric motor according to the invention is hereinafter described, by way of example, with reference to the accompanying drawings.

BRIEF DESCRIPTION OF THE DRAWINGS

FIG. 5 is a sectional end elevation, similar to FIG. 2, showing a modified motor according to the invention;

FIG. 6 is an isometric view of a contact member constituting part of the motor shown in FIG. 5; and FIG. 7 is a sectional end elevation, similar to FIG. 2, showing a further modified motor according to the invention.

PREFERRED MODE FOR CARRYING OUT THE INVENTION

Figure 1:
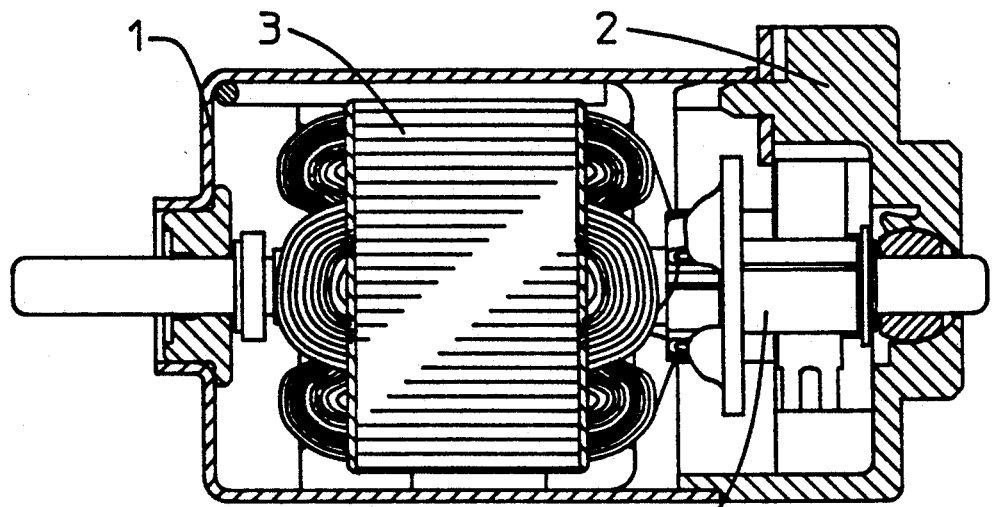
FIG. 1 is a sectional side elevation of a thermally protected electric motor according to the present invention.
Figure 2:
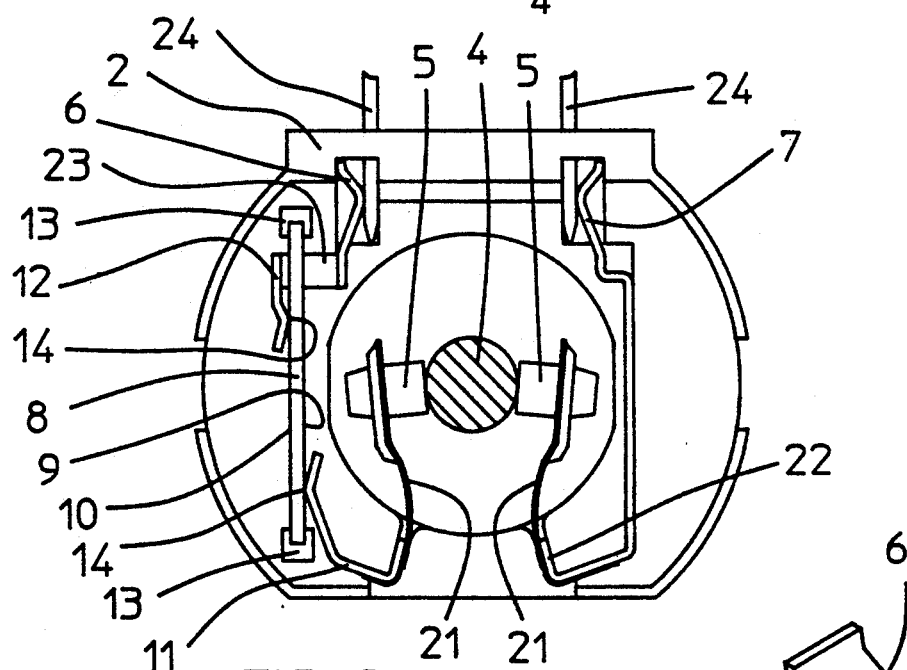
FIG. 2 is a schematic sectional end elevation of an end cap forming part of the motor shown in FIG. 1.

As shown in FIGS. 1 and 2, a housing 1 having an end cap 2 at one end encloses a rotor 3, incorporating a commutator 4. Brushes 5, engaging the commutator 4, and two terminals 6 and 7, for connecting the brushes 5 to an external electric supply, are mounted within the end cap 2. A laminated, metal-polymer-metal PTC resistor 8 having two substantially parallel opposed surfaces 9 and 10 is also mounted within the end cap 2 and two electrically conductive contact members 11 and 12 connected, respectively, to one of the brushes 5 and to one of the terminals 6 respectively engage the two opposed surfaces 9 and 10 of the PTC resistor 8.

The end cap 2 is moulded from plastics material and, as shown in FIG. 2, is provided with thermally insulated supporting means in the form two slotted retainers 13 which accommodate opposite edges of the PTC resistor 8 to engage and thereby directly support the PTC resistor 8 against movement perpendicular to the surfaces 9 and 10, in both directions. Brushes 5 are mounted on brush leaves 21 which are rivetted, on the left hand side, to contact member 11 and, on the right hand side, to a stem 22 of the other terminal 7. The terminal 6 is connected to the contact member 12 by means of an integral cross bar 23 and the two terminals 6 and 7 are arranged for engagement with the prongs 24 (only partly shown) of a plug connected to an external electric supply.

Figures 3, 4:
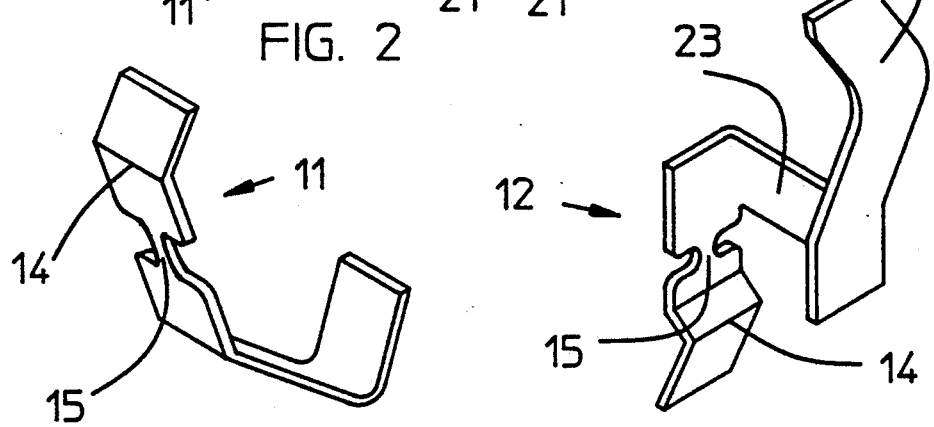
FIGS. 3 and 4 are isometric views of contact members constituting parts of the motor shown in FIGS. 1 and 2.

As shown in FIGS. 2, 3 and 4, the contact members 11 and 12 have bent ends which form contact portions 14 which make line contact with the surfaces 9 and 10 of the PTC resistor 8. As also shown, each of the contact members 11 and 12 is formed with a neck portion 15 between the contact portion 14 and the remainder of the contact member in order to inhibit the flow of heat between the contact portion 14 and the remainder of the contact member.

As well as being bent or folded transversely, as shown in FIGS. 3 and 4, in alternative constructions, not shown, the contact members 11 and 12 may be bent or folded longitudinally to form contact portions, along the bends or folds, which make line contact with the surfaces 9 and 10 of the PTC resistor 8, or each contact portion may be in the form of a protrusion, such as a conical point or a part-spherical formation pressed out of the contact member 11 or 12, which makes point contact with one of the surfaces 9 and 10.

In the embodiment shown in FIG. 5, the thermally insulating supporting means constitute an abutment 13 (shown in section) and the laminate PTC resistor 8 is clamped securely between the abutment 13 and the contact member 11 which respectively engage the surfaces 10 and 9 of the PTC resistor 8. The other contact member 12 extends through an aperture 25 in the abutment 13 to contact the surface 10 of the PTC resistor 8.

As shown in FIG. 6, the contact portion 14 of the contact member 11 is a conical point pressed from the contact member 11 to make point contact with the surface 9 of the PTC resistor 8. A similar protrusion on the other contact member 12 provides a contact portion 14 which makes point contact with the surface 10 of the PTC resistor 8.

In a more complex embodiment, shown in FIG. 7, a laminated, metal-polymer-metal PTC resistor 8 is seated in a slot 26 between two abutments 13A and 13B which engage and thereby directly support opposite side of the PTC resistor 8. Brushes 5 are mounted on brush leaves 21 which are rivetted, on the left hand side, to a contact member 11 and, on the right hand side, to a strap 27 which itself is rivetted to a stem 22 of the terminal 7. The stem 22 and the attached end of the strap 27 are seated in a slot 28 similar to slot 26. As in the other illustrated embodiments, the terminals 6 and 7 are mounted in the end cap 2 for engagement with the prongs 24 (only partly shown) of a plug connected to an external electric supply. The terminal 6 is formed integral with the contact member 12 and, as shown, the slot 26 is shaped so as to accommodate the contact members 11 and 12 so that contact portions 14 similar to the contact portions 14 described with reference to FIGS. 5 and 6 clamp spaced parts 16 and 17 of the laminate PTC resistor 8 against the two abutments 13A and 13B.

What is claimed is:

1. A thermally protected electric motor, comprising:
   a housing having an end cap;
   a rotor, incorporating a commutator, mounted within the housing;
   brushes engaging the commutator, and two terminals for connecting the brushes to an external electrical supply, mounted within the end cap;
   a laminated, metal-polymer-metal PTC resistor mounted within the end cap and having two substantially parallel opposed surfaces;
   two electrically conductive contact members connected, respectively, to one of the brushes and to one of the terminals and respectively engaging the two substantially parallel opposed surfaces, both contact members having a limited area of contact with the PTC resistor and making substantial electrical contact with the PTC resistor; and exerting a sufficiently low contact pressure on the PTC resistor such that the contact members do not change the electrical characteristics of the PTC resistor, and such that at least one of the contact members provides substantially no support for the PTC resistor against movement perpendicular to said opposed surfaces; and
   thermally insulating supporting means, in the end cap, which engage and directly support the PTC resistor against movement perpendicular to the substantially parallel opposed surfaces, at least in one direction.

2. A motor according to claim 1, in which the contact members have contact portions which make point contact with the two substantially parallel opposed surfaces of the PTC resistor.

3. A motor according to claim 2, in which the two substantially parallel opposed surfaces are disposed on opposite sides of the PTC resistor and the two contact portions make contact with the two substantially parallel opposed surfaces at points which are spaced from each other as measured along a plane parallel to the substantially parallel opposed surfaces.

4. A motor according to claim 1, in which the contact members have contact portions which make line contact with the two substantially parallel opposed surfaces of the PTC resistor.

5. A motor according to claim 1, in which each of the contact members is formed with a necked portion between the contact portion and the remainder of the contact member.

6. A motor according to claim 1, in which the thermally insulating supporting means supports the PTC resistor against movement perpendicular to the transverse substantially parallel opposed surfaces, in both directions.

7. A motor according to claim 1, in which the thermally insulating supporting means comprise an abutment which engages one of the substantially parallel opposed surfaces and the PTC resistor is clamped between the abutment and one of the two electrically conductive contact members.

8. A motor according to claim 1, in which the thermally insulating supporting means comprise two abutments which cooperate, respectively, with the two electrically conductive contact members, and the PTC resistor has two parts which are clamped against the two abutments, respectively, by the two contact members.

9. A thermally protected electric motor, comprising:
a housing having an end cap;
a rotor, incorporating a commutator, mounted within the housing;
brushes engaging the commutator, and two terminals for connecting the brushes to an external electrical supply, the brushes and terminals being mounted within the end cap;
a laminated, metal-polymer-metal PTC resistor mounted within the end cap and having two transversely spaced parts and, on opposite sides, two substantially parallel opposed surfaces;
two electrically conductive contact members connected, respectively, to one of the brushes and to one of the terminals and respectively having contact portions which make point contact with the two substantially parallel opposed surfaces and which each have a neck portion disposed between the contact portion and the remainder of the contact member;
said two electrically conductive contact members respectively engaging the two substantially parallel opposed surfaces for making substantial electrical contact at a limited area of contact with the PTC resistor, and exerting a sufficiently low contact pressure on the PTC resistor such that the contact members do not change the electrical characteristics of the PTC resistor, and such that at least one of the contact members provides substantially no support for the PTC resistor against movement perpendicular to said opposed surfaces; and
thermally insulating supporting means in the form of two abutments, in the end cap, which engage and thereby directly support the PTC resistor against movement perpendicular to the substantially parallel opposed surfaces, and cooperate, respectively, with the two contact members to clamp the two parts of the PTC resistor.

* * * * *